United States Patent
Nishtala

(10) Patent No.: US 6,834,362 B2
(45) Date of Patent: Dec. 21, 2004

(54) APPARATUS AND METHOD FOR ERROR DETECTION ON SOURCE-SYNCHRONOUS BUSES

(75) Inventor: Satyanarayana Nishtala, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 551 days.

(21) Appl. No.: 09/818,024

(22) Filed: Mar. 26, 2001

(65) Prior Publication Data

US 2002/0138789 A1 Sep. 26, 2002

(51) Int. Cl.[7] ............................................. G06F 11/08
(52) U.S. Cl. ........................... 714/43; 714/48; 714/58; 714/700; 714/701; 710/106
(58) Field of Search ........................ 714/43, 56, 700, 714/701, 800; 713/503

(56) References Cited

U.S. PATENT DOCUMENTS

| | | | | |
|---|---|---|---|---|
| 5,784,393 A | * | 7/1998 | Byers et al. ................. | 714/800 |
| 6,178,206 B1 | * | 1/2001 | Kelly et al. .................. | 375/257 |
| 6,209,072 B1 | * | 3/2001 | MacWilliams et al. ..... | 711/167 |
| 6,622,256 B1 | * | 9/2003 | Dabral et al. ............... | 713/600 |
| 6,697,974 B2 | * | 2/2004 | Craft ........................... | 714/700 |
| 6,704,890 B1 | * | 3/2004 | Carotti et al. .............. | 714/700 |
| 2002/0087921 A1 | * | 7/2002 | Rodriguez .................. | 714/56 |
| 2002/0157062 A1 | * | 10/2002 | Greiner ....................... | 714/801 |
| 2002/0174390 A1 | * | 11/2002 | Craft ........................... | 714/700 |

* cited by examiner

*Primary Examiner*—Robert Beausoliel
*Assistant Examiner*—Joseph D Manoskey
(74) *Attorney, Agent, or Firm*—Park, Vaughan & Fleming, LLP; Edward J. Grundler

(57) ABSTRACT

One embodiment of the present invention provides a system for detecting errors on a source-synchronous bus. The source-synchronous bus includes a plurality of data lines and a clock line. A transmitting mechanism configured to transmit data on the source-synchronous bus is coupled to the source-synchronous bus. A receiving mechanism configured to receive data from the source-synchronous bus is also coupled to the source-synchronous bus. An error detecting mechanism configured to detect errors on the source-synchronous bus is coupled to the receiving mechanism. The error detecting mechanism can detect errors on the plurality of data lines including errors that are caused by an error on the clock line.

15 Claims, 4 Drawing Sheets

FIG. 3B

| $d_{00}$ | $d_{01}$ | $d_{02}$ | $d_{03}$ | $d_{04}$ | $d_{05}$ | $d_{06}$ | $d_{07}$ | $p_0$ |
|---|---|---|---|---|---|---|---|---|
| $d_{10}$ | $d_{11}$ | $d_{12}$ | $d_{13}$ | $d_{14}$ | $d_{15}$ | $d_{16}$ | $d_{17}$ | $p_1$ |
| $d_{20}$ | $d_{21}$ | $d_{22}$ | $d_{23}$ | $d_{24}$ | $d_{25}$ | $d_{26}$ | $d_{27}$ | $p_2$ |
| $d_{30}$ | $d_{31}$ | $d_{32}$ | $d_{33}$ | $d_{34}$ | $d_{35}$ | $d_{36}$ | $d_{37}$ | $p_3$ |
| $d_{40}$ | $d_{41}$ | $d_{42}$ | $d_{43}$ | $d_{44}$ | $d_{45}$ | $d_{46}$ | $d_{47}$ | $p_4$ |
| $d_{50}$ | $d_{51}$ | $d_{52}$ | $d_{53}$ | $d_{54}$ | $d_{55}$ | $d_{56}$ | $d_{57}$ | $p_5$ |
| $d_{60}$ | $d_{61}$ | $d_{62}$ | $d_{63}$ | $d_{64}$ | $d_{65}$ | $d_{66}$ | $d_{67}$ | $p_6$ |
| $d_{70}$ | $d_{71}$ | $d_{72}$ | $d_{73}$ | $d_{74}$ | $d_{75}$ | $d_{76}$ | $d_{77}$ | $p_7$ |
| $d_{80}$ | $d_{81}$ | $d_{82}$ | $d_{83}$ | $d_{84}$ | $d_{85}$ | $d_{86}$ | $d_{87}$ | $p_8$ |
| ... | ... | ... | ... | ... | ... | ... | ... | ... |
| $d_{n0}$ | $d_{n1}$ | $d_{n2}$ | $d_{n3}$ | $d_{n4}$ | $d_{n5}$ | $d_{n6}$ | $d_{n7}$ | $p_n$ |

FIG. 3C

|   |   |   |   |   |   |   |   |   | $p_0$ |
|---|---|---|---|---|---|---|---|---|---|
|   |   |   |   |   |   |   |   | $d_{07}$ | $p_1$ |
|   |   |   |   |   |   |   | $d_{06}$ | $d_{17}$ | $p_2$ |
|   |   |   |   |   |   | $d_{05}$ | $d_{16}$ | $d_{27}$ | $p_3$ |
|   |   |   |   |   | $d_{04}$ | $d_{15}$ | $d_{26}$ | $d_{37}$ | $p_4$ |
|   |   |   |   | $d_{03}$ | $d_{14}$ | $d_{25}$ | $d_{36}$ | $d_{47}$ | $p_5$ |
|   |   |   | $d_{02}$ | $d_{13}$ | $d_{24}$ | $d_{35}$ | $d_{46}$ | $d_{57}$ | $p_6$ |
|   |   | $d_{01}$ | $d_{12}$ | $d_{23}$ | $d_{34}$ | $d_{45}$ | $d_{56}$ | $d_{67}$ | $p_7$ |
|   | $d_{00}$ | $d_{11}$ | $d_{22}$ | $d_{33}$ | $d_{44}$ | $d_{55}$ | $d_{66}$ | $d_{77}$ | $p_8$ |
| $d_{10}$ | $d_{21}$ | $d_{32}$ | $d_{43}$ | $d_{54}$ | $d_{65}$ | $d_{76}$ | $d_{87}$ |   | ... |
| $d_{20}$ | $d_{31}$ | $d_{42}$ | $d_{53}$ | $d_{64}$ | $d_{75}$ | $d_{86}$ | ... |   | $p_n$ |
| $d_{30}$ | $d_{41}$ | $d_{52}$ | $d_{63}$ | $d_{74}$ | $d_{85}$ | ... | $d_{n7}$ |   |   |
| $d_{40}$ | $d_{51}$ | $d_{62}$ | $d_{73}$ | $d_{84}$ | ... | $d_{n6}$ |   |   |   |
| $d_{50}$ | $d_{61}$ | $d_{72}$ | $d_{83}$ | ... | $d_{n5}$ |   |   |   |   |
| $d_{60}$ | $d_{71}$ | $d_{82}$ | ... | $d_{n4}$ |   |   |   |   |   |
| $d_{70}$ | $d_{81}$ | ... | $d_{n3}$ |   |   |   |   |   |   |
| $d_{80}$ | ... | $d_{n2}$ |   |   |   |   |   |   |   |
| ... | $d_{n1}$ |   |   |   |   |   |   |   |   |
| $d_{n0}$ |   |   |   |   |   |   |   |   |   |

APPARATUS AND METHOD FOR ERROR DETECTION ON SOURCE-SYNCHRONOUS BUSES

BACKGROUND

1. Field of the Invention

The present invention relates to detecting communications errors between functional units in a computer system. More specifically, the present invention relates to an apparatus and a method for detecting errors on a source-synchronous bus within a computer system.

2. Related Art

It is essential for the various functional units of a computing system to communicate with each other in order for the computing system to perform its assigned tasks. Traditionally, these functional units, which include the central processing unit, memory, I/O devices, and the like, are coupled together by a bus structure. When a first functional unit needs to communicate with a second functional unit, the first functional unit typically requests access to the bus from a bus master. The bus master then grants the first functional unit exclusive access to the bus for a bus transaction. During the transaction, the bus is not available to the other functional units.

In older, slower computing systems, a global clock signal is distributed to each of the functional units. Typically, within each function unit, the global clock signal is regenerated using circuitry such as a phase-lock loop. Regenerating this global clock signal removes any noise on the clock signal, thereby virtually eliminating errors in data transferred between functional units attributable to the clock signal.

More modern computing systems, however, operate at higher clock rates, which causes problems when a global clock signal is used. Since the global clock signal arrives at a functional unit by a different route than the data signals, the clock signal can be offset in time from the data signals. At these higher clock rates, the margins for error are much smaller than the margins at lower clock rates.

In an effort to alleviate the problems associated with global clock signals, designers have developed source-synchronous buses. A source-synchronous bus differs from older bus systems in that the clock signal is routed along with the other data signals between the source and the destination. Care is taken to provide the same path lengths and environment for the clock as for the data. Source-synchronous buses, therefore, essentially eliminate any offset in time between the clock signal and the associated data signals.

However, using a source-synchronous bus can cause problems. The clock signal is not regenerated in the source-synchronous bus as it is for the global clock signal used in previous structures, but instead, the clock signal is used as received. Since the clock signal used with a source-synchronous bus is subject to the same environment as the data signals, the clock signals are subject to the same kind of errors as are found on the data signals.

However, errors on the clock signals are more catastrophic than similar errors on the data signals. This is so because a faulty clock signal affects all of the data signals whereas a faulty data signal affects only the one data signal. This makes error detection on a source-synchronous bus difficult. For example, a parity bit can be used to detect a single bit error. A clock error, however, affects multiple bits and may not be detected by a parity bit.

Furthermore, an error correcting code typically corrects a single bit error and detects most multiple bit errors. However, if the clock signal is faulty, it is probable that more than one data bit would be affected, thereby negating the advantage of using the error correcting code.

What is needed is an apparatus and a method for detecting errors on a source-synchronous bus while maintaining the high throughput associated with a source-synchronous bus.

SUMMARY

One embodiment of the present invention provides a system for detecting errors on a source-synchronous bus. The source-synchronous bus includes a plurality of data lines and a clock line. A transmitting mechanism configured to transmit data on the source-synchronous bus is coupled to the source-synchronous bus. A receiving mechanism configured to receive data from the source-synchronous bus is also coupled to the source-synchronous bus. An error detecting mechanism configured to detect errors on the source-synchronous bus is coupled to the receiving mechanism. The error detecting mechanism can detect errors on the plurality of data lines including errors that are caused by an error on the clock line.

In one embodiment of the present invention, the system includes a grouping mechanism coupled to the transmitting mechanism that is configured to group data bits into an error group. The system also includes a detection code generating mechanism coupled to the grouping mechanism that is configured to generate a detection code for the error group. The transmitting mechanism is further configured to transmit the detection code on the source-synchronous bus using a clock cycle other than the clock cycle used for the error group.

In one embodiment of the present invention, the detection code is a parity bit.

In one embodiment of the present invention, the detection code is an error correcting code.

In one embodiment of the present invention, the grouping mechanism is configured to skew data bits within the error group across time.

In one embodiment of the present invention, skewing data bits across time includes delaying each data bit based on the position of the data bit within the error group.

In one embodiment of the present invention, the system provides a gathering mechanism coupled to the receiving mechanism that is configured to de-skew the data bits within the error group.

BRIEF DESCRIPTION OF THE FIGURES

FIG. 3B illustrates a group of coded data 206 in accordance with an embodiment of the present invention.

FIG. 3C illustrates skewed data 306 in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Computing Elements

Figure 1:
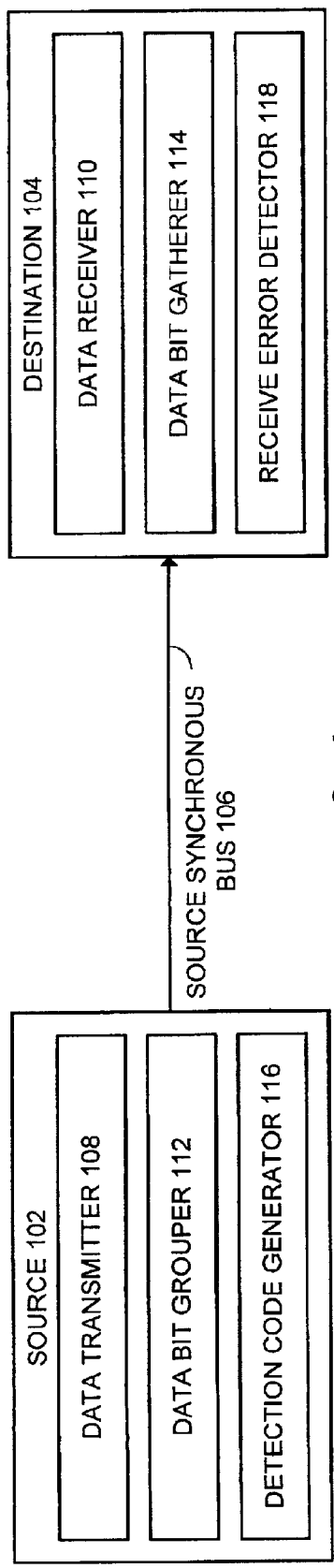
FIG. 1 illustrates computing elements coupled together by source-synchronous bus 106 in accordance with an embodiment of the present invention.

FIG. 1 illustrates computing elements coupled together by source-synchronous bus 106 in accordance with an embodiment of the present invention. Source 102 and destination 104 are coupled together by source-synchronous bus 106. Source 102 can include any source of data transactions within a computing system. For example, source 102 can include a central processing unit. Destination 104 can include any destination of data transactions within a computing system. For example, destination 104 can include a memory subsystem.

Source 102 includes data transmitter 108, data bit grouper 112 and detection code generator 116. Detection code generator 116 generates error detection codes for data to be transmitted on source-synchronous bus 106. The operation of detection code generator 116 is discussed below in conjunction with FIG. 2.

Data bit grouper 112 groups the data bits into an error group. After the data bits are grouped into an error group, the bits are skewed across time. Details of data bit grouper 112 are discussed in conjunction with FIG. 3A.

Data transmitter 108 receives the skewed data from data bit grouper 112 and sends the skewed data to destination 104 across source-synchronous bus 106.

Destination 104 includes data receiver 110, data bit gatherer 114, and receive error detector 118. Data receiver 110 receives the skewed data sent by source 102 across source-synchronous bus 106 and passes the received data to data bit gatherer 114. Data bit gatherer 114 de-skews the received data. Details of the operation of data bit gatherer 114 is discussed below in conjunction with FIG. 4.

Receive error detector 118 receives the coded data from data bit gatherer 114. Receive error detector 118 detects errors in the data as described below in conjunction with FIG. 5. If receive error detector 118 detects no errors, the data becomes available for use by destination 104.

Detection Code Generator

Figure 2:
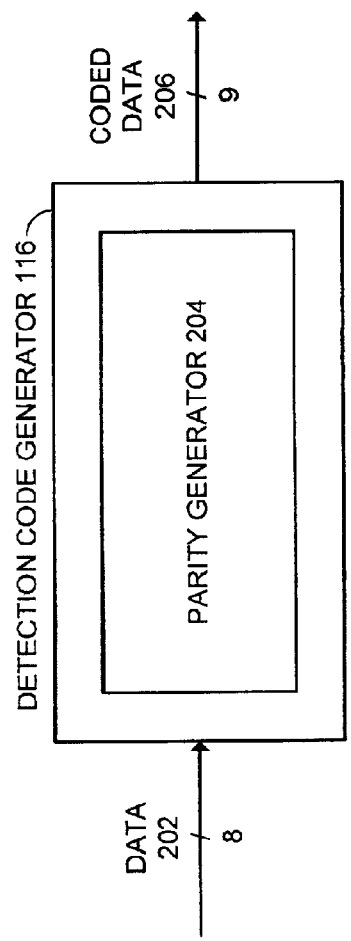
FIG. 2 illustrates details of detection code generator 116 in accordance with an embodiment of the present invention.

FIG. 2 illustrates details of detection code generator 116 in accordance with an embodiment of the present invention. Detection code generator 116 includes parity generator 204. Detection code generator 116 accepts incoming data 202 from source 102. In FIG. 2, data 202 includes eight data bits, however, there is nothing inherent in the present invention that restricts the incoming data to eight bits. A person of ordinary skill in the art will be able to extend the ideas of this invention to include any number of data bits.

Parity generator 204 generates a parity bit for data 202. This parity bit can be configured as odd parity or even parity as desired. The output of parity generator 204 is supplied by detection code generator 116 as coded data 206.

A person of ordinary skill in the art will be able to replace parity generator 204 within detection code generator 116 with any other detection code generator or by an error correcting code generator. The number of bits added to data 202 by detection code generator 116 to make coded data 206 can be more than one bit.

Data Bit Grouping

Figure 3A:
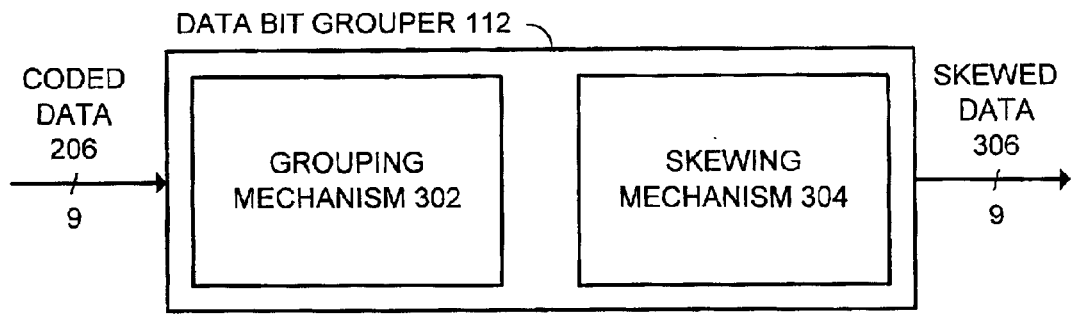
FIG. 3A illustrates details of data bit grouper 112 in accordance with an embodiment of the present invention.

FIG. 3A illustrates details of data bit grouper 112 in accordance with an embodiment of the present invention. Data bit grouper 112 includes grouping mechanism 302 and skewing mechanism 304. Grouping mechanism 302 groups the incoming data into one or more words, where a word is the number of bits in coded data 206. In this example, the number of bits in a word is nine. The number of words that grouping mechanism 302 includes in a group can be determined empirically by the designer to protect data transmissions from errors without adversely affecting detection latency. A group of data words is described in more detail in conjunction with FIG. 3B Optionally, data bit grouper 112 can include a mechanism, such as a longitudinal parity mechanism, for checking the data bits on a single line. Such longitudinal parity bits would be appended to the group as an additional data word.

Skewing mechanism 304 provides skewed data 306 to data transmitter 108 for transmission on source-synchronous bus 106. Skewing mechanism 304 skews the bits of the data group across time so that for each clock signal, the data word of skewed data 306 sent during that clock signal includes bits from several words of coded data 206. Skewing mechanism 304 operates by inserting a different number of delay cycles into each data line. Details of skewed data 306 and the delay mechanisms in skewing mechanism 304 are discussed in greater detail in conjunction with FIG. 3C below.

FIG. 3B illustrates a group of coded data 206 in accordance with an embodiment of the present invention. Grouping mechanism 302 combines a quantity of words, designated by the subscript n, of coded data 206 into a group as shown. Optionally, the last word of a group can be a longitudinal parity word, or other group error word as discussed above.

The bits within a group are numbered by a subscript, such as 27 in $d_{27}$. The two indicates the data word within the group, while the seven indicates the bit within the word. The subscript on the parity bit, such as the four in $p_4$ indicates that this is the parity bit for word four.

FIG. 3C illustrates skewed data 306 in accordance with an embodiment of the present invention. Skewing mechanism 304 includes delays in the paths of the various bits to delay the bits by a different number of clock periods for each bit line. As illustrated in FIG. 3C, the parity bit is not delayed, data bit seven is delay by one clock cycle, data bit six is delayed by two clock cycles, and so on until data bit zero is delayed for eight clock cycles.

By skewing the data as shown in FIG. 3, bits from several different data words are transmitted during each clock cycle. For example, during the time that bit zero from word zero, $d_{00}$, is being transmitted, bit one from word one, bit two from word two, bit three from word three, bit four from word four, bit five from word five, bit six from word six, bit seven from word seven, and the parity bit from word eight are being transmitted. An error on the clock signal during this bit time could affect several of these bits simultaneously. However, after the bits are de-skewed, each bit will be back in its own data word, and any data words with erroneous bits will be detected because the erroneous bits will no longer be in the same data word.

Data Bit Gatherer

Figure 4:
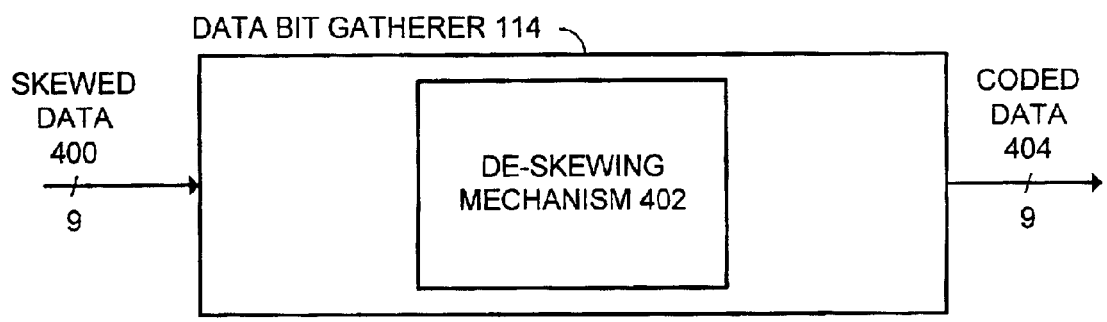
FIG. 4 illustrates details of data bit gatherer 114 in accordance with an embodiment of the present invention.

FIG. 4 illustrates details of data bit gatherer 114 in accordance with an embodiment of the present invention. Data bit gatherer 114 receives skewed data 400 from data receiver 110 within destination 104. Skewed data 400 is the received data from source-synchronous bus 106 and includes skewed data 306 modified by any errors in skewed data 306 while in transit on source-synchronous bus 106.

Data bit gatherer 114 includes de-skewing mechanism 402. De-skewing mechanism 402 is similar in construction to skewing mechanism 304. However, in de-skewing mechanism 402, data bit zero is not delayed, data bit one is delayed one clock time, and so on. This provides a total delay of eight clock cycles for each data line and for the parity line, which results in coded data 404.

Coded data 404 is coded data 206 plus any errors that were introduced on the data while in transit across source-synchronous bus 106. Coded data 404 is coupled to receive error detector 118 so that errors in coded data 404 can be detected, and optionally, corrected.

Receive Error Detection

Figure 5:
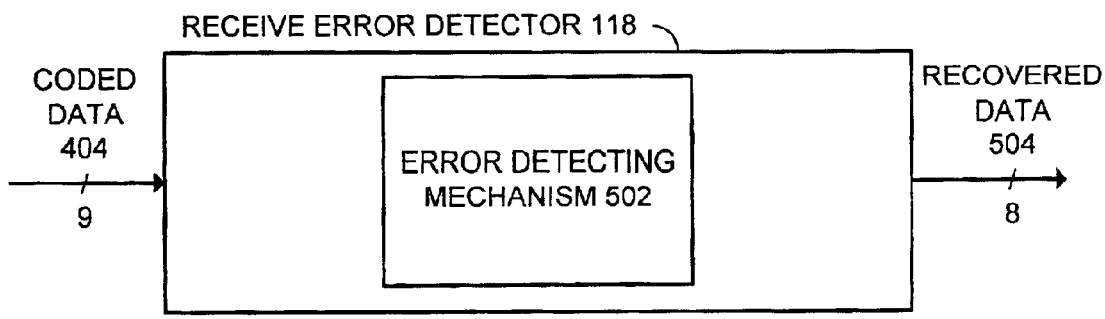
FIG. 5 illustrates details of receive error detector 118 in accordance with an embodiment of the present invention.

FIG. 5 illustrates details of receive error detector 118 in accordance with an embodiment of the present invention. Coded data 404 is supplied to receive error detector 118. Receive error detector 118 includes error detecting mechanism 502. Error detecting mechanism 502 is the complement of parity generator 204 within detection code generator 116. Error detection mechanism 502 examines coded data 404 to determine if any bits are in error. Remember, however, that there should be no more than one bit in error even if the error was caused by an error in the clock signal.

Optionally, error detecting mechanism 502 can be replaced with forms of error detection other than parity checking, and can include an error correcting mechanism. Error detecting mechanism 502 can also be configured to check for errors using a longitudinal parity if one is generated within source 102.

If error detecting mechanism 502 does not detect any errors, recovered data 504 is supplied to destination 104.

Sending Data on the Bus

Figure 6:
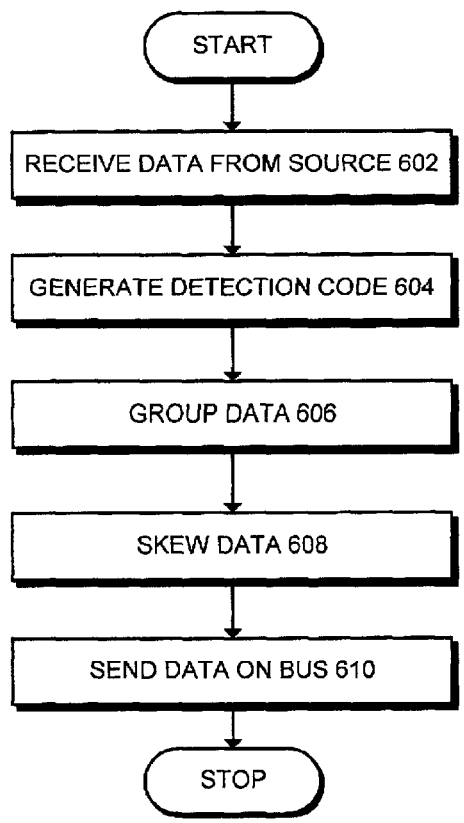
FIG. 6 is a flowchart illustrating the process of sending data on source-synchronous bus 106 in accordance with an embodiment of the present invention.

FIG. 6 is a flowchart illustrating the process of sending data on source-synchronous bus 106 in accordance with an embodiment of the present invention. The system starts when detection code generator 116 receives data 202 from source 102 to be sent to destination 104 across source-synchronous bus 106 (step 602).

Parity generator 204 within detection code generator 116 generates the detection code for data 202 to create coded data 206 (step 604). Coded data 206 is then sent to data bit grouper 112 where grouping mechanism 302 groups coded data 206 into error groups (step 606). Next, skewing mechanism 304 skews the data to create skewed data 306 (step 608).

Finally, data transmitter 108 sends skewed data 306 across source-synchronous bus 106 to destination 104 (step 610).

Receiving Data from the Bus

Figure 7:
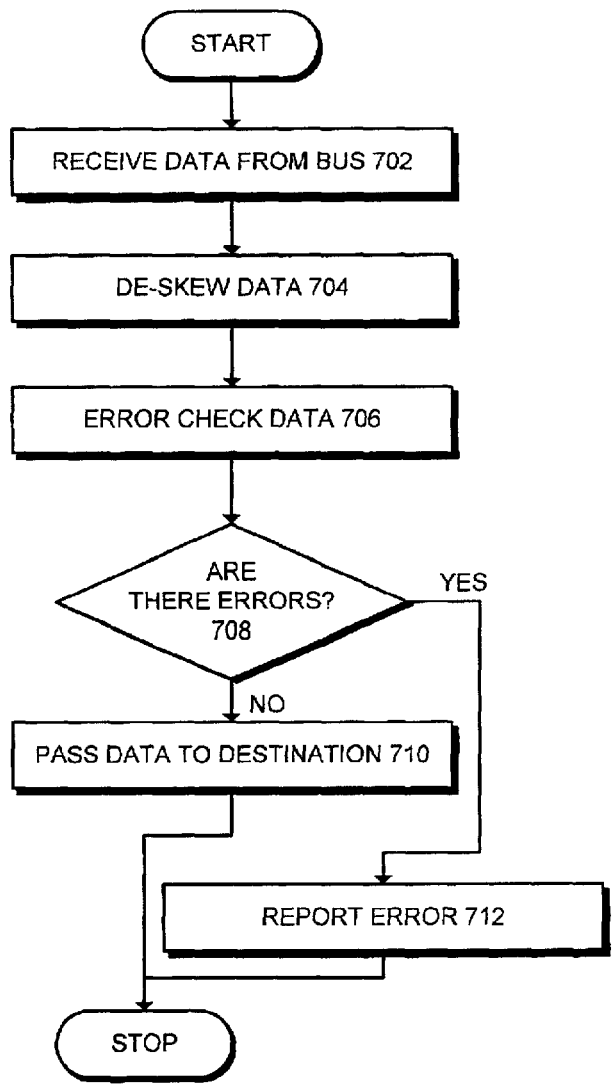
FIG. 7 is a flowchart illustrating the process of receiving data from source-synchronous bus 106 in accordance with an embodiment of the present invention.

FIG. 7 is a flowchart illustrating the process of receiving data from source-synchronous bus 106 in accordance with an embodiment of the present invention. The system starts when data receiver 110 within destination 104 receives skewed data 400 from source 102 across source-synchronous bus 106 (step 702). Note that skewed data 400 is skewed data 306 plus any errors generated during transmission across source-synchronous bus 106.

Data receiver 110 passes skewed data 400 to data bit gatherer 114. De-skewing mechanism 402 within data bit gatherer 114 de-skews the data to recreate the error groups for error detecting mechanism 502 (step 704). Data bit gatherer 114 then passes coded data 404 to receive error detector 118.

Error detecting mechanism 502 within receive error detector 118 next determines if there are any errors in coded data 404 (step 706). If there are no errors in coded data 404 (step 708), processing continues at 710. Recovered data 504 is passed to destination 104 for use (step 710). If there are errors in coded data 404, receive error detector 118 reports the error to destination 104 (step 712).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus for detecting errors on a source-synchronous bus, comprising:

the source-synchronous bus, wherein the source-synchronous bus includes a plurality of data lines and a clock line;

a transmitting mechanism coupled to the source-synchronous bus, wherein the transmitting mechanism is configured to transmit data on the source-synchronous bus;

a receiving mechanism coupled to the source-synchronous bus, wherein the receiving mechanism is configured to receive data from the source-synchronous bus;

an error detecting mechanism coupled to the receiving mechanism that is configured to detect errors on the source-synchronous bus;

a grouping mechanism coupled to the transmitting mechanism that is configured to group data bits into an error group, wherein the grouping mechanism is further configured to skew data bits within the error group across time;

a detection code generating mechanism coupled to the grouping mechanism that is configured to generate a detection code for the error group; and the transmitting mechanism that is further configured to transmit the detection code on the source-synchronous bus using a clock cycle other than the clock cycles used for transmitting data bits of the error group, wherein at a given instant in time each data line in the plurality of data lines carries a data bit from a different error group;

wherein each data bit in the error group is transmitted at a different time so that no two bits associated with the error group are transmitted at the same time;

wherein the receiving mechanism is further configured to deskew the data bits in the error group; and wherein the error detecting mechanism can detect errors in the error group including errors that are caused by an error on the clock line.

2. The apparatus of claim 1, wherein the detection code is a parity bit.

3. The apparatus of claim 1, wherein the detection code is an error correcting code.

4. The apparatus of claim 1, wherein skewing data bits across time includes delaying a data bit based on a position of the data bit within the error group.

5. The apparatus of claim 1, further comprising a gathering mechanism coupled to the receiving mechanism, wherein the gathering mechanism is configured to de-skew data bits within the error group.

6. A method for detecting errors on a source-synchronous bus, wherein the source-synchronous bus includes a plurality of data lines and a clock line, the method comprising:

grouping data bits into an error group;

generating a detection code for the error group;

skewing data bits within the error group across time;

transmitting data from a source on the source-synchronous bus, wherein each data bit in the error group is transmitted at a different time so that no two bits associated with the error group are transmitted at the same time;

transmitting the detection code on the source-synchronous bus using a clock cycle other than the clock cycles used for transmitting data bits of the error group, wherein at a given instant in time each data line in the plurality of data lines carries a data bit from a different error group;

receiving data at a destination from the source-synchronous bus;

deskewing the data bits in the error group; and detecting data errors at the destination, wherein detecting data errors includes detecting errors in the error group that are caused by errors on the clock line.

7. The method of claim 6, wherein the detection code is a parity bit.

8. The method of claim 6, wherein the detection code is an error correcting code.

9. The method of claim 6, wherein skewing data bits across time includes delaying a data bit based on a position of the data bit within the error group.

10. The method of claim 6, further comprising de-skewing data bits within the error group.

11. A computing system for detecting errors on a source-synchronous bus, comprising:

the source-synchronous bus, wherein the source-synchronous bus includes a plurality of data lines and a clock line;

a central processing unit coupled to the source-synchronous bus, wherein the central processing unit is configured to transmit data on the source-synchronous bus;

a memory unit coupled to the source-synchronous bus, wherein the memory unit is configured to receive data from the source-synchronous bus;

an error detecting mechanism coupled to the memory unit that is configured to detect errors on the source-synchronous bus;

a grouping mechanism coupled to the transmitting mechanism that is configured to group data bits into an error group, wherein the grouping mechanism is further configured to skew data bits within the error group across time;

a detection code generating mechanism coupled to the grouping mechanism that is configured to generate a detection code for the error group; and the transmitting mechanism that is further configured to transmit the detection code on the source-synchronous bus using a clock cycle other than the clock cycles used for transmitting data bits of the error group, wherein each data bit in the error group is transmitted at a different time so that no two bits associated with the error group are transmitted at the same time, and wherein at a given instant in time each data line in the plurality of data lines carries a data bit from a different error group;

wherein data bits in the error group are transmitted at different times;

wherein the memory unit is further configured to deskew the data bits in the error group; and wherein the error detecting mechanism can detect errors in the error group including errors that are caused by an error on the clock line.

12. The computing system of claims 11, wherein the detection code is a parity bit.

13. The computing system of claim 11, wherein the detection code is an error correcting code.

14. The computing system of claim 11, wherein skewing data bits across time includes delaying a data bit based on a position of the data bit within the error group.

15. The computing system of claim 11, further comprising a gathering mechanism coupled to the memory unit, wherein the gathering mechanism is configured to de-skew data bits within the error group.

* * * * *